April 15, 1952  H. J. OGORZALY  2,593,338
CONTACTING SOLID PARTICLES WITH GASEOUS FLUIDS
Filed Jan. 28, 1947

Henry J. Ogorzaly Inventor
By P. J. Whelan Attorney

Patented Apr. 15, 1952

2,593,338

UNITED STATES PATENT OFFICE 2,593,338

CONTACTING SOLID PARTICLES WITH GASEOUS FLUIDS

Henry J. Ogorzaly, Summit, N. J., assignor to Standard Oil Development Company, a corporation of Delaware Application January 28, 1947, Serial No. 724,760

3 Claims. (Cl. 23—1)

This invention relates to catalytic operations using powdered catalyst or contact material, wherein the particles are circulated by means of hydrostatic pressure developed in standpipes, and more particularly relates to reducing erosion of slide valves in the standpipes, which valves are used to control the flow of the powdered material from the standpipes.

My invention may be used in processes using powdered contact material and in catalytic operations generally, where powdered catalyst is circulated by means of hydrostatic pressure developed in standpipes having slide control valves, but it will be specifically described in connection with the catalytic conversion of hydrocarbons.

The rate of flow of fluidized catalysts or other solids from a standpipe is ordinarily controlled by the use of a slide valve to control the area for passage of the solids from the standpipe. These valves are subject to severely erosive conditions, and their failure may be the cause for bringing a unit off-stream. A large part of the erosion results from excessive pressure-drop across the slide valves, and this high pressure differential in turn results from the fact that standpipes of adequate length to insure circulation with fresh catalyst or contact particles may generate excessive pressures during the course of the operation of the unit.

In constructing fluid catalyst units using powdered catalyst, the units are designed for fresh catalyst, of a given type, for certain pressures and bed levels in the reaction and regeneration vessels, for certain pressure-drops across the slide valves controlling the flow of solids from the standpipes and for certain pressure-drops in catalyst and recycle lines. The standpipes are designed and constructed of sufficient height to develop the hydrostatic pressure at the base of the standpipe which will be sufficient to overcome pressure-drops through the system.

Numerous changes may occur during operation which result in higher pressures being developed by the standpipe and consequently greater pressure-drops across the slide valves, which cause increased erosion of the control slide valves. For example, after extended use in the unit, the catalyst becomes more dense, and this results in higher standpipe pressures. In addition, fresh catalyst contains fines, and fluidized fresh catalyst will have a lower density than fluidized catalyst which has been used for some time in the unit, because of the loss of fines from the system; and as a result, the used catalyst forms a more dense fluidized mixture and builds up higher pressures at the base of the standpipes.

In bottom draw-off units where dense fluidized catalyst is withdrawn from the bottom portion of the dense fluidized mixture or bed in a contacting zone, the height of the mixture or bed in the contacting zone builds up a hydrostatic pressure which is added to the hydrostatic pressure developed by the column of fluidized solids in the standpipes. The unit may be designed for one fluid bed thickness and may later be operated with a deeper fluidized bed of greater thickness in the contacting zone. This will also result in a greater pressure being developed by the standpipe and a greater pressure-drop across the slide valve, and consequently, there will be more erosion of the slide valve.

Frequently, operating conditions require shifting the pressure in one contacting vessel or another to a different level than anticipated in the design. A change of this type is directly reflected in the pressure drop across the slide valve controlling the flow of catalyst to or from this vessel.

Similarly, operating conditions may dictate the circulation of greater or lesser amounts of catalyst, or the utilization of variable quantities of carrier gas in the catalyst transfer lines. The resulting variation in pressure drop in these transfer lines is also reflected in the differential pressure across the slide valves.

In some cases, the fluidized catalyst unit may be designed and constructed for one type of catalyst, and the unit later operated on a denser catalyst which will give higher pressures at the base of the standpipes and more erosion of the slide valves.

According to my invention, the pressure differential across a slide valve is reduced during the run or operation of the unit by having previously installed a constriction such as an orifice, or preferably a Venturi-type throat with gradually constricting inlet and expanding egress, etc. in the line below a slide valve discharging from a standpipe into a stream of carrier vapors or gases. The pressure below the slide valve and above the constriction will be greater than if the constriction were not installed, and therefore the pressure differential across the slide valve is reduced.

According to an improved form of my invention, the constriction is installed in the line below the slide valve as mentioned in the previous paragraph, but in addition, connections or lines are installed to permit proportioning of the flow of carrier gas or vapor between two points of injection, one between the constriction and the slide valve and one after the constriction. By changing the amount of gas or vapor introduced into the line above the constriction, the pressure differential across the constriction may be varied and the pressure differential across the slide valve may be controlled at any desired value, as may be required to minimize erosion, independently of shifts in the operating conditions of the unit.

If the pressure differential across the slide valve is increased for any reason, more gas or vapor is introduced above the constriction and below the slide valve, and by forcing more gas or vapor through the constriction, there will be a greater pressure differential across the constriction and a lessened pressure drop across the slide valve. If the differential pressure across the slide valve decreases to below the differential desired for safety or necessary to pass the required amount of catalyst, the amount of gas or vapor being passed into the pipe above the constriction and below the slide valve will be decreased.

The rest of the gas or vapor is mixed with the catalyst or contact material after it has passed through the constriction and the resulting mixture or suspension is passed to the proper contacting zone for further treatment.

In the drawing, the figure represents one form of apparatus which may be used in carrying out my invention.

Referring now to the drawing, the reference character 10 designates a cylindrical reaction or contacting zone having a conical bottom 11 and an inlet 12 for introducing gaseous fluid and solid particles into the vessel 10. In the specific form of the apparatus shown in the drawing, hot, regenerated catalyst or contact particles are introduced into line 12 from line 14. The feed is introduced into line 12 from main line 16 having branch lines 18 and 20. The branch line 18 has a valve 22 for controlling the amount of feed introduced into line 12. The other branch line 20 has a valve 24 for controlling the flow of feed through line 20, as will be hereinafter described in greater detail.

The gaseous fluid containing the solid particles is preferably introduced into an inverted conical feed member 26, provided at its upper end with a horizontal perforated distribution plate or grid member 28, for distributing the gaseous fluid and solid particles evenly across the reaction or contacting vessel 10. Instead of introducing the gaseous fluid and solid particles through a common inlet, the gaseous fluid and solid particles may be separately introduced into the vessel 10.

The inverted conical feed member 26 is arranged in the lower part of the reaction vessel 10, and is spaced from the inner wall of the vessel to provide an annular space 30 for withdrawing solid particles as a dense fluidized mixture from the lower portion of the vessel 10.

In a catalytic conversion operation, the oil feed introduced through lines 16 and 18 may comprise vaporous or liquid hydrocarbons such as gas oil, heavy or light naphtha, etc., or may comprise preheated reduced crude petroleum oil. Where the hydrocarbon feed is only partially preheated, the heat of vaporization and cracking is supplied by using a sufficient amount of hot, regenerated catalyst or contact particles.

The velocity of the hydrocarbon vapors passing upwardly through the reaction vessel 10 is selected to maintain the catalyst particles in a dense, fluidized, liquid-simulating, turbulent condition shown at 32, and having a level indicated at 34 with a dilute or less dense suspension thereabove indicated at 36. The superficial velocity of the gaseous fluid or hydrocarbon vapors passing upwardly through the vessel 10 is the velocity of the gas or vapor in a vessel free of solids, and is preferably between about 0.2 foot per second and 2.0 feet per second, preferably 0.5–1.5 feet per second.

In the catalytic cracking of hydrocarbons, the cracking catalyst may comprise acid-treated bentonite clays, synthetic silica-alumina gels, synthetic silica-magnesia gels, and the like. The synthetically prepared catalyst may also be in the form of small spheres.

In the catalytic conversion of hydrocarbons, the temperature should be between about 800° F. and 1050° F. For example, for the catalytic cracking of hydrocarbons to produce gasoline, the temperature may be between about 900° and 1000° F. The time of residence of the hydrocarbon vapors in the conversion zone may be between about 5 seconds and 50 seconds. When using the silica-alumina gels in finely-divided form, the density of the fluidized mixture 32 in the vessel 10 is about 15 pounds per cubic foot to 40 pounds per cubic foot, depending upon the velocity of the upwardly flowing hydrocarbon vapors as well as the density and particle size of the catalyst.

The vapors passing upwardly through the reaction vessel 10 entrain some solid particles as they pass upwardly into the upper less dense suspension indicated at 36, and in order to remove most of the entrained particles, the vapors are passed through inlet 38 into separating means 40. The separating means 40 is shown as a cyclone separator arranged in the upper part of the reaction vessel 10, but other forms of separating means may be used, such as Multiclones, and if desired, the separating means may be arranged outside of the vessel 10. Also, one or more cyclone separators or other separating means may be used and the separators may be arranged in parallel or in series.

In the separating means 40, most of the entrained solid particles are removed from the vaporous reaction products, the separated particles being returned to the dense mixture 32 by dip leg or pipe 42. The vaporous reaction products pass overhead through line 44 and are preferably passed to separation equipment for recovering desired products. In the catalytic cracking of hydrocarbons, the vaporous reaction products are preferably passed to a fractioning tower (not shown) for separating desired products such as a gasoline from higher-boiling hydrocarbons. The vaporous reaction products leaving the separator 40 still contain small amounts of catalyst particles which are recovered as a slurry in the condensate oil in the bottom of the fractionating tower. This catalyst comprises catalyst fines and is preferably recovered from the condensate oil by filtering, settling, etc., and the catalyst returned to the reactor or regenerator.

During the catalyst conversion of hydrocarbons, the catalyst particles become contaminated or fouled with coke or hydrogen-containing carbonaceous material, and before reusing them in another conversion operation it is necessary to regenerate them, as, for example, by burning the carbonaceous deposits from the particles in a separate regeneration zone. Before regenerating the catalyst particles, it is preferred to strip out hydrocarbons entrained with or adsorbed on the fouled or contaminated catalyst particles.

The conical bottom 11 of the vessel 10 forms a withdrawal passageway 46 with the bottom portion of the conical feed member 26, for withdrawing fouled or spent catalyst particles from the dense mixture 32. Stripping gas such as steam or other inert gas is introduced through one or more lines 48 into the lower portion of the annular stripping section or zone 30 for passage upwardly between the downwardly moving particles to strip out fouled or entrained hydrocarbons. Fluidizing gas is introduced through line or lines 52 into the conical bottom 11 of the vessel 10 to maintain the catalyst particles in a fluidized condition as they are withdrawn from the bottom portion of the reaction vessel 10.

The dense fluidized stripped particles are introduced into the upper portion of a standpipe 54 provided with one or more fluidizing lines 56 for introducing fluidizing gas into the standpipe 54 for maintaining the particles in a dense fluidized liquid-simulating condition, so that the fluidized mixture produces a hydrostatic pressure at the base of the standpipe. The standpipe 54 is provided with a slide control valve 58 for controlling the rate of withdrawal of catalyst particles from the vessel 10, and for maintaining the level 34 of the dense fluidized mixture at the desired distance from the top of the vessel 10. In commercial units, this distance of the level of the fluidized mixture to the top of the reaction vessel is preferably maintained between about 10 feet and 20 feet to reduce by settling out the amount of catalyst particles entrained with the gaseous fluid leaving the top of the reaction vessel.

As the fluidized particles pass through the slide valve 58, there is a certain pressure-drop so that the pressure below the slide valve is less than the pressure above the slide valve. In commercial units, this pressure-drop is desired to be about 5 pounds per square inch, i. e., the apparatus is designed and constructed so that in normal operation there will be a pressure-drop of about 5 pounds per square inch. However, after the unit remains in operation for a relatively long period of time, the catalyst particles become more dense, catalyst fines are lost from the system, and as the catalyst drops toward an equilibrium activity level, the bed level 34 in reaction vessel 10 may be raised to maintain conversion, thus producing a higher pressure in the standpipe 54.

Under these conditions, the pressure developed by the standpipe is greater than the design figure and the pressure-drop across the slide valve 58 will be in excess of 5 pounds. This increase in pressure-drop results in increased erosion of the slide valve, and it is the purpose of my invention to compensate for such changes and to maintain the pressure-drop across the slide valve 58 substantially constant.

The pressure-drop across the slide valve 58 may be increased to as much as 20 pounds per square inch under certain operating conditions. For instance, the commercial unit reaction zone may have been originally designed for low-pressure operation, under which condition the pressure-drop across the slide valve 58 would be about 5 pounds per square inch. After the unit has been in operation for some time, it may be desired to increase the capacity of the unit by placing the reaction zone under increased pressure or superatmospheric pressure. The advantage of higher pressure on the reaction zone is that hydrocarbon feed may be charged to the unit at increased mass rates of flow without exceeding velocity limitations in the reaction zone or in the fractionator directly connected to the reaction zone. Excessive velocity at these points results in increased entrainment of powdered catalyst from the reactor of liquefied cracked products within the fractionator.

In order to maintain the pressure-drop or differential across the slide valve 58, I provide a constriction shown generally at 62 in the line 64 which leads from the bottom of the slide valve 58 and which communicates with the standpipe 54. As shown in the drawing, the constriction 62 is a Venturi-type throat having a relatively long conical portion 66 and a shorter more abrupt conical portion 68 leading to the line 64 below the constriction 62. Instead of using a venturi, an orifice may be used to produce a pressure-drop or pressure differential across a portion of the line 64.

To provide flexibility in the pressure-drop taken across the constriction 62, it is preferred to introduce a controllable gaseous stream between slide valve 58 and constriction 62.

This may be done by subdividing the regenerating gas such as air or other oxygen-containing gas into two streams, and feeding one stream above the constriction 62 and the other stream below the constriction 62. The regenerating gas is introduced through line 72 and a portion is passed through line 74, having a valve 76, into the line 64 below the constriction 62, and the other part of the regenerating gas is passed through line 78, having a valve 82 for introducing the regenerating gas above the constriction 62. The two streams are so proportioned as to vary the pressure-drop or pressure differential across the constriction 62 to compensate for changes in the pressure differential across the slide valve 58. For example, if the pressure differential across the slide valve 58 is greatly in excess of the desired figure, more of the regenerating gas will be passed through the valved line 78 above the constriction 62 to create or produce a greater pressure-drop or pressure differential across constriction 62, thereby increasing the pressure in the line 66 above the constriction 62, so that the pressure-drop or pressure differential across the slide valve 58 is maintained at 5 pounds per square inch, or the desired design figure. The rest of the regenerating gas is passed through line 74 into the bottom portion of line 64.

The contaminated particles with the regenerating gas are then passed upwardly through line 84 into the conical bottom portion 86 of a regenerator 88 below the horizontally arranged distribution plate or grid member 90 therein. The regeneration vessel 88 is shown as arranged above the reactor or reaction vessel 10, but other arrangements may be used. The grid member 90 functions to evenly distribute the catalyst particles and the regenerating gas across the area of the regeneration vessel 88.

The superficial velocity of the regenerating gas is selected to maintain the catalyst or contact particles as a dense, fluidized, liquid-simulating turbulent mixture or layer shown at 92, having a level indicated at 94. Above the level 94 is a less dense or dilute suspension 96. The superficial velocity of the upflowing regenerating gas in the vessel 88 may be between about 0.2 foot per second and 2.0 feet per second, and preferably about 0.5 foot per second to 1.5 feet per second. Using the catalyst above-described, the density of the mixture in the regeneration vessel 88 will be between about 15 pounds per cubic foot and 40 pounds per cubic foot.

The regeneration gases passing upwardly into the dilute or less dense phase 96 contain entrained catalyst particles and in order to separate most of these particles, the regeneration gases are passed through separating means 98 having an inlet 102. The separating means 98 is shown in the drawing as a cyclone separator arranged in the upper portion of the regeneration vessel 88, but if desired, the separating means may be arranged outside of the vessel 88. Other separating means may be used and more than one separating means may be used in parallel or in series. The separated particles accumulate in the separating means 98 and are returned to the dense bed or mixture 92 in the vessel 88 by means of a dip leg or dip pipe 104.

The regeneration gases leave the separating means 98 and pass overhead through line 105, and as they will contain some fine catalyst particles, they are preferably introduced into another separating means, such as a Cottrell precipitator (not shown). The separated particles from the precipitator may be returned to the dense bed or mixture 92 in the vessel 88, but are preferably introduced into the standpipe 106 extending from the bottom portion of the regeneration vessel 88. The temperature during regeneration may be between about 1000° F. and 1150° F.

Regenerated catalyst particles at a temperature of about 1000° F. to 1150° F. are withdrawn from the bottom portion of the dense fluidized mass or mixture 92 in the vessel 88 by means of a well 108 arranged at one side of the regeneration vessel and formed by an upstanding partition 110 which extends for a short distance above the distribution grid member 98. The hot, regenerated catalyst particles are introduced into the upper portion of the standpipe 106. Fluidizing gas is preferably introduced along the length of the standpipe through lines 112 to maintain the particles in the standpipe in a fluidized, liquid-simulating condition, so that a hydrostatic pressure is produced at the base of the standpipe for passing the catalyst particles into the reaction vessel 10.

The standpipe 106 is provided at its lower portion with a slide control valve 114 for controlling the rate of withdrawal of regenerated particles from the standpipe. The slide valve 114 is designed for a certain pressure-drop as, for example, 5 pounds per square inch. Where the hydrostatic pressure developed by the standpipe 106 is greatly in excess of the design figure, and for other reasons previously described the pressure-drop or pressure differential across the slide valve 114 may be relatively large and this results in increased erosion of the slide valve.

The construction of the constriction and the operation of my invention to reduce the pressure-drop across the slide valve 114 are substantially the same as those above-described in connection with the slide valve 58 and constriction 62, and further detailed description is not believed necessary. Below slide valve 114, a line 116 is provided having a constriction 118, which is similar to the constriction 62 above-described. Below the constriction 118 the catalyst particles flow into line 14 from which they are fed into the inlet line 12 leading into the reaction vessel 10.

In the catalytic cracking of hydrocarbons, the ratio of catalyst to oil by weight may be between about 5 and 35. With a certain selected operation, the catalyst to oil ratio will be substantially constant and the amount of hydrocarbon feed passed through line 16 will be substantially constant. This feed is preferably split between the line 18 leading to inlet line 12 and line 20 leading to catalyst line 116 above the constriction 118. When it is desired to maintain the pressure-drop or pressure differential across the slide valve 114 substantially constant, or when it is desired to compensate for fluctuations in the pressure at the base of the standpipe 106, the amount of hydrocarbon feed passing through line 20 above the constriction 118 will be changed to increase or decrease the pressure-drop or pressure differential across constriction 118, to maintain the pressure-drop or pressure differential across valve 114 substantially at the desired figure, which may be about 5 pounds per square inch.

Specific examples will now be given of the application of my invention to a commercial unit in which about 40 tons per minute of finely-divided catalyst of about 200–400 mesh or finer are circulated. The unit is designed for a pressure-drop of about 5 pounds per square inch across the slide valve 58 or slide valve 114. The pressure-drop across either or both of these valves 58 and 114 may increase to about 10 pounds per square inch, due to the increased density of the catalyst particles or increased density of the mixture, due to loss of fines or increase in the depth of the bed in the reactor or regeneration vessel or for numerous other reasons. To reduce the pressure-drop across the valve 58 or slide valve 114, a constriction such as 62 or 118 is placed in the line 64 leading from slide valve 58 or line 116 leading from slide valve 114.

The opening in the constriction 62 or 118 is about 1.1 square feet. Under these conditions, the pressure above the constriction will be increased and the pressure-drop or pressure differential across the slide valve 58 or 114 will be maintained at the desired figure of about 5 pounds per square inch.

Where the pressure differential across the slide valve fluctuates or where it is greatly in excess of the desired figure, as, for example, where the pressure-drop across the slide valve is about 15 pounds per square inch, I use the improved form of my invention of injecting added gas or vapor above the constriction and below the slide valve, and so proportion the flow of the gas or vapor as to increase the pressure differential across the constriction to the desired extent, and in this manner reduce the pressure-drop across the slide valve to the desired figure. Where the slide valve 58 is designed for a pressure-drop of about 5 pounds per square inch, and with the catalyst flowing through the opening in the slide valve at the rate of about 40 tons per minute, the unit is operating under normal conditions.

When the hydrostatic pressure built up by the differential pressure across the slide valve 114 increases to about 15 pounds per square inch, the valve in line 20 may be opened to permit feed to pass into line 116 below the slide valve and above constriction 118. The amount of gas added is about 40 cubic feet per second to increase the pressure differential across the constriction 118 to about 10 pounds per square inch so that the pressure in the line 116 above the constriction 118 will be correspondingly increased and the pressure-drop or pressure differential across the slide valve 118 will be reduced to about 5 pounds per square inch or the desired figure.

While I have shown one form of apparatus and different forms of operating my invention, and have included specific examples, it is to be understood that these are to be by way of illustration only, and various changes and modifications may be made without departing from the spirit of my invention. Especially it is to be understood that rather than dividing the feed or air flows as previously described in order to obtain a controllable supply of gases to be injected between the slide valve and the constriction, an entirely separate stream, such as process steam, may be used to modify the pressure drop across the constriction.

What I claim is:

1. An apparatus of the character described including a vessel, means for introducing powdered contacting material thereinto, means for introducing a gaseous fluid into the lower portion of said vessel at such a rate as to maintain a dense fluidized bed of contacting material therein, a standpipe communicating with said vessel and adapted to receive dense fluidized contacting material from said vessel, a slide valve in the lower portion of said standpipe for controlling the rate of withdrawal of contacting material from said standpipe, a line below said valve and communicating with said standpipe, said line being provided with a constriction to introduce a pressure-drop after said valve, and means for subdividing a gaseous fluid stream and introducing some of the gaseous fluid into said line between said constriction and said slide valve and the rest of the gaseous fluid into said line after said constriction.

2. In a process wherein powdered contact material is maintained in a zone in a dense fluidized condition and is withdrawn from said zone into a standpipe to form a fluidized dense column producing hydrostatic pressure at its base and the rate of withdrawal of powdered material from the base of said column is controlled by a valve across which a decrease in pressure in the direction of solids flow occurs during withdrawal of said powdered material and the powdered material is then passed as a confined stream to a second zone, the improvement which comprises passing the powdered material through a constriction in the confined stream leaving said valve, introducing a gaseous stream between said constriction and said valve and proportioning the gaseous fluid stream to control the pressure differential across said valve.

3. The process of claim 2 wherein the gaseous stream introduced between the constriction and the valve is by-passed from the feed material entering the said second zone.

HENRY J. OGORZALY.

REFERENCES CITED

The following references are of record in the file of this patent:

UNITED STATES PATENTS

| Number | Name | Date |
|---|---|---|
| 2,409,751 | Gerhold et al. | Oct. 22, 1946 |
| 2,437,334 | Roetheli | Mar. 9, 1948 |
| 2,440,482 | Martin | Apr. 29, 1948 |